United States Patent [19]
Ahls et al.

[11] Patent Number: 5,704,464
[45] Date of Patent: Jan. 6, 1998

[54] PASSENGER SENSOR FOR AN ESCALATOR OR MOVING WALK

[75] Inventors: Hermann W. Ahls, OT Vehlen; Detlev Abraham, Berlin; Oliver Stöxen, Seelze; Dietmar Krüger, Rintein, all of Germany

[73] Assignee: Otis Elevator Company, Farmington, Conn.

[21] Appl. No.: 672,282

[22] Filed: Jun. 28, 1996

[51] Int. Cl.⁶ .................................................. B65G 43/00
[52] U.S. Cl. ............................................................ 198/322
[58] Field of Search ................................... 198/322, 323, 198/572

[56] References Cited

FOREIGN PATENT DOCUMENTS 2911658  9/1980  Germany .............................. 198/322

Primary Examiner—James R. Bidwell

[57] ABSTRACT

A passenger sensor for a conveyor includes a transmitter assembly that is positioned within a channel in the conveyor balustrade. The transmitter assembly includes a plurality of transmitters that are spaced along a cable to form a transmitter chain. Each transmitter includes a module and a connector attached thereto. The transmitter assembly is disposed within the channel without the need for mounting hardware or openings within the balustrade for the passage of the cable. In a particular embodiment, a receiver assembly is disposed in a channel in the opposite balustrade in a similar manner.

8 Claims, 2 Drawing Sheets

PASSENGER SENSOR FOR AN ESCALATOR OR MOVING WALK

TECHNICAL FIELD

This invention relates to passenger conveyors, such as escalators or moving walks, and more particularly to passenger sensors for such conveyors.

BACKGROUND OF THE INVENTION

Escalators and moving walks are very effective means for conveying passengers efficiently from one landing or floor to another landing or floor. A typical escalator comprises a plurality of moving platforms, in the form of steps, that are sequentially attached to a pair of step chains. The step chains travel over a pair of sprockets on either end of the escalator, one of which is driven by a machine. Alongside the path of the steps are a pair of balustrades, each including a moving handrail for passengers to hold onto as they are carded along by the steps. A typical moving walk is similar to the escalator except that the platforms are pallets rather than steps.

A recent development in the field of escalators and moving walks has been the integration of passenger sensors. In some applications, the passenger sensors are positioned proximate to the entrance to a conveyor to trigger the operation of the conveyor upon the approach of a passenger. In other applications, a plurality of passenger sensors are distributed along the length of the conveyor to determine the presence of a passenger. This application of passenger sensors permits the conveyor to be automatically restarted after a shut down. This eliminates the need for a mechanic to visit the conveyor to ensure that there are no passengers prior to starting the conveyor.

One drawback to the passenger sensors distributed along the length of the conveyor is the cost of installing each of the sensors and connecting the associated cabling to the controller for the escalator or moving walk. Each of the sensors must be mounted and oriented for proper operation. In addition, since the sensors are readily apparent to passengers, they are susceptible to vandalism. Such vandalism negates the usefulness of the passenger sensor.

The above art notwithstanding, scientists and engineers under the direction of Applicants' Assignee are working to develop cost effective and reliable means to sense the presence of passengers on escalators and moving walks.

SUMMARY OF THE INVENTION

According to the present invention, a passenger sensor includes a plurality of transmitters, each transmitter having a module and a connector, and a cable. The cable interconnects the transmitters via the connectors to form a transmitter chain. The transmitter chain fits within an externally facing channel in the balustrade profile of the passenger conveyor. In a particular embodiment, a receiver chain is disposed on the opposite balustrade and includes a plurality of receivers that are receptive to signals generated by the transmitters.

One feature of the present invention is the transmitter chain and the receiver chain. This feature results in the advantage of simplifying the assembly and installation of the passenger sensor. The transmitter chain and receiver chain may be assembled separately from the passenger conveyor. Once assembled, the transmitter chain and receiver chain may be installed into their respective channels in the balustrade. This method of installation avoids the time consuming and costly steps of mounting each transmitter and receiver individually to the balustrade and installing cabling through openings in the balustrade for each transmitter and receiver.

According to a specific embodiment of the present invention, the modules engage the surfaces of the channels to retain the transmitters in position while at the same time providing space between the module and the channel for the interconnection of the connectors and the cable. This feature eliminates the need to provide mounting hardware or fasteners to retain the transmitters to the balustrade. The advantage is a quicker and less costly installation.

According to another specific embodiment, the passenger sensor further includes a translucent cover that is snap-fit over the channel. This cover permits transmission of signals emitted by the transmitters without permitting passengers to visually locate the position of the transmitters. This feature reduces the susceptibility of the passenger sensor to vandalism and thereby improves the reliability of the passenger sensor and passenger conveyor.

The foregoing and other objects, features and advantages of the present invention become more apparent in light of the following detailed description of the exemplary embodiments thereof, as illustrated in the accompanying drawings.

BEST MODE FOR CARRYING OUT THE INVENTION

Figure 1:
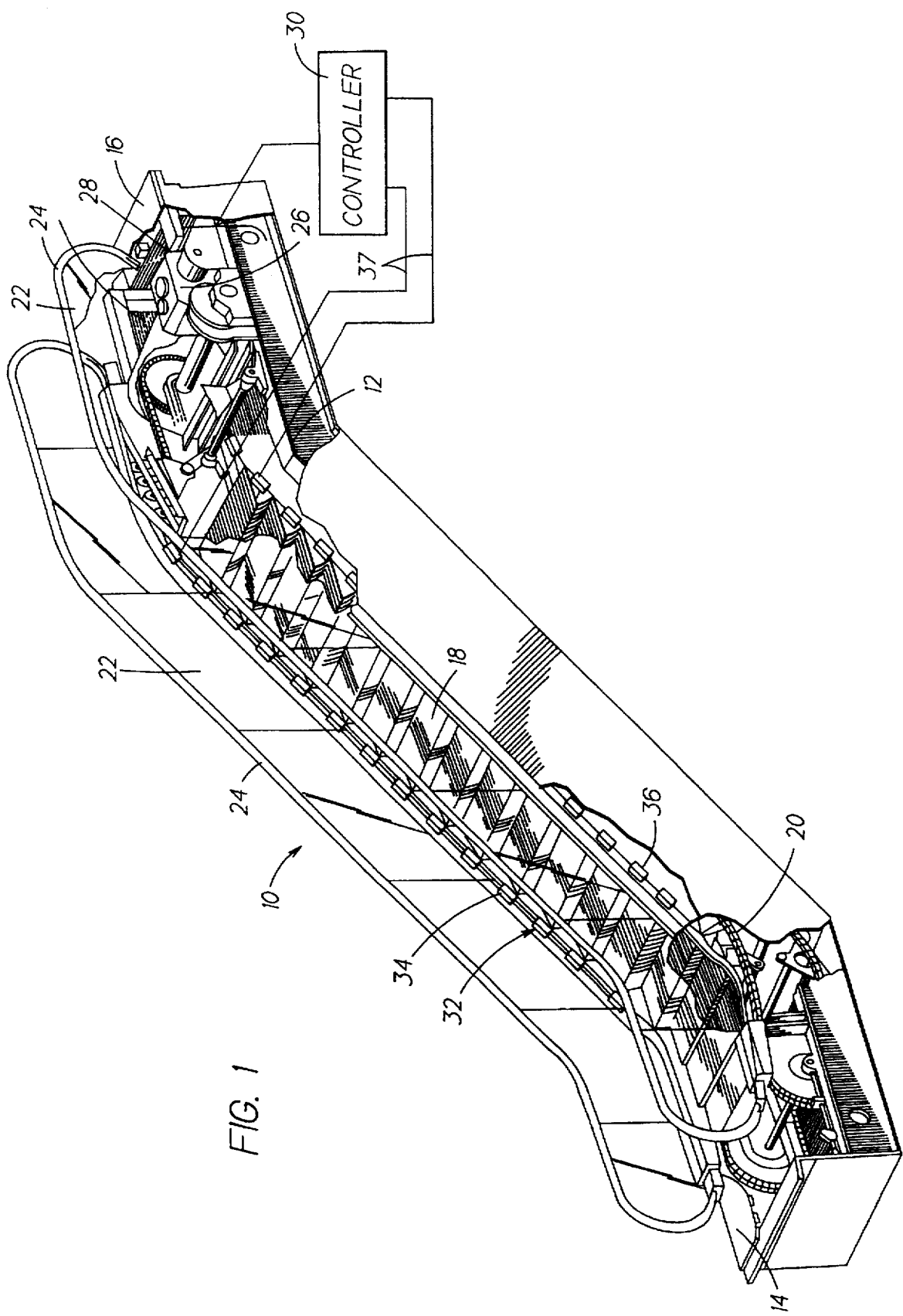
FIG. 1 is a perspective view of an escalator.

FIG. 1 shows an escalator 10 as an exemplary embodiment of a passenger conveyor and which is used to describe the present invention. It should become apparent in the ensuing description that the invention is applicable to other types of passenger conveyors, such as moving walks.

The escalator 10 includes a truss 12 extending between a lower landing 14 and an upper landing 16, a plurality of sequentially connected treadplates 18 connected to a step chain 20 and traveling through a closed loop path within the truss 12, a pair of balustrades 22 having handrails 24, and a machine 26 for driving the treadplates 18 and handrails 24. The machine 26 is located in a machine space 28 under the upper landing 16 and is operationally connected to a controller 30. The controller 30 determines the operational condition of the escalator, i.e., running at standby speed, running at transport speed, stopped, etc.

Passengers (not shown) are carded along between the landings 14, 16 by the treadplates 18. A passenger sensor system 32 is disposed along the balustrades 22 proximate to the passenger carrying surface of the treadplates. The passenger sensor system functions to determine the presence of passengers on the escalator 10. The passenger sensor system includes a transmitter assembly 34 disposed along one side of the escalator 10 and a receiver assembly 36 disposed along the opposite side of the escalator 10. The transmitter assembly 34 and receiver assembly 36 are each connected by a cable 37 to the controller 30 for power and communication.

Figure 2:
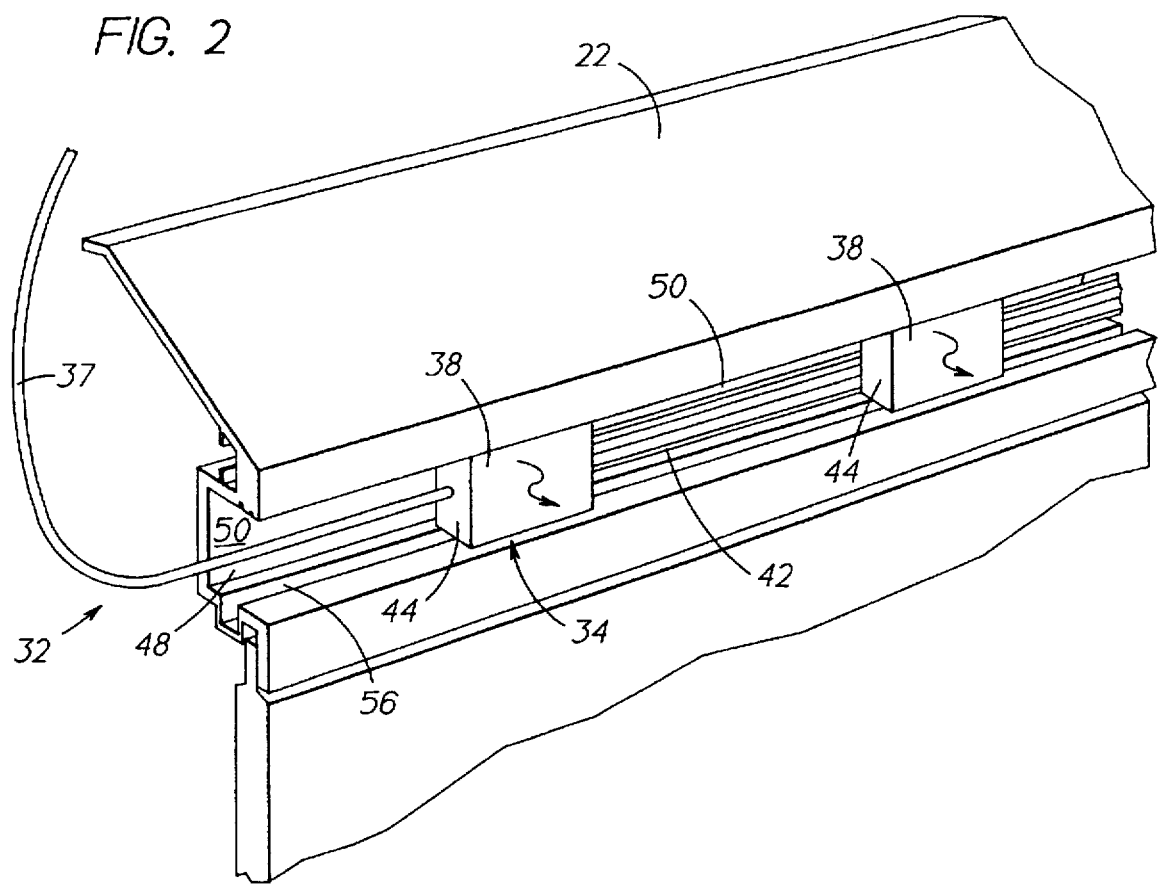
FIG. 2 is a cut-away view of a balustrade profile and a transmitter chain with the channel cover removed.
Figure 3:
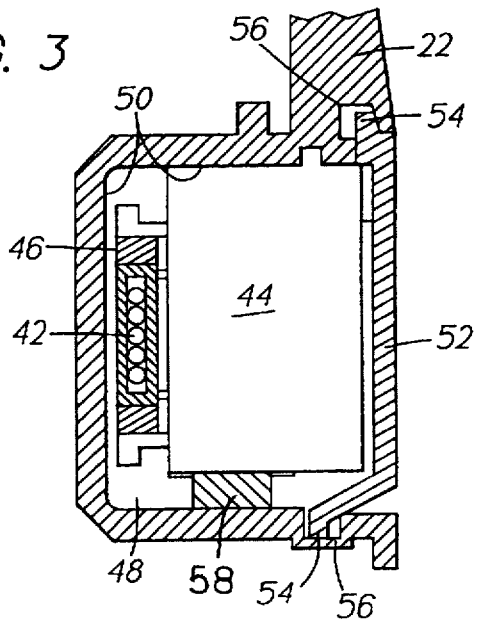
FIG. 3 is a sectional view of the channel, transmitter chain and channel cover.

As shown more clearly in FIGS. 2 and 3, the transmitter assembly 34 includes a plurality of longitudinally spaced transmitters 38 interconnected by a ribbon cable 42 to form a transmitter chain. Each transmitter 38 includes a module 44, which houses the signal transmitting device (not shown), and a connector 46. The connector 46 engages the module 44 with the cable 42 for electrical power and communications. The signal transmitting device may be selected, as desired, from any of the commercially available devices, such as infrared transmitters, RF transmitters, optical transmitters, etc.

The transmitter assembly 34 is mounted within an externally facing channel 48 that extends longitudinally in the balustrade 22. The module 44 and channel 48 are sized such that space is provided between the module 44 and the external facing surfaces 50 of the channel 48 to accommodate the connector 46. A translucent cover 52 includes tabs 54 that snap-fit into slots 56 in the channel 48. The cover 52 is formed from a material that is transparent to the signals being emitted by the transmitters 38. Although shown and described as translucent, the covers 52 may, however, be opaque relative to visible light such that when installed the transmitters 38 are not visible to passengers riding the escalator 10.

The receiver assembly 36 is configured similar to the transmitter assembly 34 and therefore will not be described in detail. The principle difference between the assemblies 34,36 is that the receiver assembly 36 includes a signal receiving device that is receptive to the signal emitted by the signal transmitting device of the transmitter assembly 34.

To install the passenger sensor system 32, the transmitter assembly 34 is fabricated by connecting each of the modules 44 to the cable 42 using the connectors 46. Each of the modules 44 is spaced at a desired distance from the adjacent modules 44, e.g. 200 mm apart. Once assembled, the entire transmitter assembly 34, including modules 44, connectors 46 and cable 42 are fit within the channel 48. The modules 44 are positioned within the channel 48 using a spacer 58 to properly align the module 44 and to maintain the position of the module 44. Although shown using a spacer, the module may be sized such that the module fits snugly within the channel thus eliminating the need for the spacer. Once the modules 44 are positioned, the cover 52 is placed over the channel 48 and the tabs 54 are snapped into the corresponding slots 56 in the balustrade 22.

The same process is used to assemble the receiver assembly 36. Each of the receiver modules are connected to the receiver cable such that there is a receiver module that corresponds to, and is positioned to receive the signal emitted by, each of the transmitter modules 44. The entire receiver assembly 36 is placed within the channel 48 in the balustrade 22 opposite the balustrade 22 containing the transmitter assembly 34. The receiver modules are aligned with the corresponding transmitter modules 44 and retained into position using the spacers. The cover for the receiver assembly is then snap-fit over the channel. After the transmitter assembly 34 and the receiver assembly 36 are installed, the cable 37 is connected to the controller 30 from each assembly 34,36.

As shown in FIGS. 1-3 and discussed above, as a result of Applicant's invention the passenger sensor system may be installed without the need to drill holes or install mounting hardware onto the balustrade. This feature minimizes the installation cost and facilitates aligning the transmitters and receivers for proper operation of the passenger sensor system.

The invention as shown in FIGS. 1-3 includes both a plurality of transmitter modules and a corresponding plurality of receiving modules that are receptive to the signals emitted by the transmitter modules. It should be apparent to one skilled in the art that transducer modules, which both emit and receive signals, may be used along with a device disposed on the balustrade opposite the transducer module that reflects or directs the emitted signal back to the transducer.

Although the invention has been shown and described with respect to exemplary embodiments thereof, it should be understood by those skilled in the art that various changes, omissions, and additions may be made thereto, without departing from the spirit and scope of the invention.

What is claimed is:

1. A passenger sensor for a passenger conveyor, the passenger conveyor including a passenger conveying platform traveling longitudinally, and a pair of balustrades extending along the sides of the platform, each balustrade including a longitudinally extending, externally facing channel, the passenger sensor including a transmitter assembly disposed within one of the channels and having a plurality of transmitters, each transmitter including a module generating a signal and a connector attached thereto, the module sized to fit within the channel, the plurality of connectors interconnected by a cable disposed within the channel to form a transmitter chain encompassed by the channel.

2. The passenger sensor according to claim 1, further including a receiver assembly disposed within the other of the channels, the receiver assembly including a plurality of longitudinally spaced receivers such that there is a receiver across from each transmitter, each receiver including a module that is receptive to the signals generated by the transmitter modules and a connector attached thereto, the receiver module sized to fit within the other of the channels, the plurality of connectors interconnected by a second cable disposed within the other of the channels to form a receiver chain encompassed by the other of the channels.

3. The passenger sensor according to claim 1, wherein the passenger sensor further includes a cover fitting over the channel encompassing the transmitter chain, and wherein the signals generated by the transmitter modules travel through the cover.

4. The passenger sensor according to claim 2, wherein the passenger sensor further includes a pair of covers, each cover fitting over one of the channels, and wherein the signals generated by the transmitter modules travel through the each of the covers.

5. The passenger sensor according to claim 1, wherein the transmitters are positioned such that the signal generated by the module is directed proximate to the passenger conveying platform, and wherein each of the plurality of modules is in a fixed relationship with the surfaces of the channel such that the module is retained in its position.

6. The passenger sensor according to claim 5, wherein the modules are sized such that space is provided between the module and the channel to permit the interconnection of the connectors and the cable.

7. A method of installing a passenger sensor for a passenger conveyor, the passenger conveyor including a passenger conveying platform traveling longitudinally, and a pair of balustrades extending along the sides of the platform, each balustrade including a profile with a longitudinally extending channel, the passenger sensor including a plurality of transmitters and a cable for interconnecting the transmitters, each transmitter including a module that generates a signal and a connector, the method including the steps of:

connecting the cable with each of the connectors such that the connectors are longitudinally spaced;

attaching one of the transmitter modules to each connector;

inserting the connected transmitters and cable into the channel; and positioning the transmitters such that the signals generated by the transmitters is directed proximate to the passenger conveying platform.

8. The method according to claim 7, wherein the profile further includes a cover fitting over the channel encompassing the transmitter chain, and wherein the signals generated by the transmitters travel through the cover, further including the step of attaching the cover over the channel.

* * * * *